US012746437B2

(12) United States Patent
Kim

(10) Patent No.: US 12,746,437 B2
(45) Date of Patent: Sep. 29, 2026

(54) SPORT BALL

(71) Applicant: Nike, Inc., Beaverton, OR (US)

(72) Inventor: George S. Kim, Wilsonville, OR (US)

(73) Assignee: NIKE, INC., Beaverton, OR (US)

( * ) Notice: Subject to any disclaimer, the term of this patent is extended or adjusted under 35 U.S.C. 154(b) by 130 days.

(21) Appl. No.: 18/174,247

(22) Filed: Feb. 24, 2023

(65) Prior Publication Data

US 2023/0271062 A1 Aug. 31, 2023

Related U.S. Application Data

(60) Provisional application No. 63/317,736, filed on Mar. 8, 2022, provisional application No. 63/314,604, filed on Feb. 28, 2022.

(51) Int. Cl.

| | |
|---|---|
| ***A63B 41/02*** | (2006.01) |
| ***A63B 41/08*** | (2006.01) |
| ***A63B 45/00*** | (2006.01) |
| ***B29K 75/00*** | (2006.01) |

(52) U.S. Cl.

CPC ............ *A63B 41/02* (2013.01); *A63B 41/085* (2013.01); *A63B 45/00* (2013.01); *B29K 2075/00* (2013.01)

(58) Field of Classification Search

CPC ......... A63B 41/02; A63B 41/08; A63B 41/10; A63B 41/085; A63B 45/00; B29K 2075/00

See application file for complete search history.

(56) References Cited

U.S. PATENT DOCUMENTS

| | | | | |
|---|---|---|---|---|
| 2,945,693 A * | 7/1960 | Way | ........................ | A63B 39/00 156/170 |
| 4,183,156 A | 1/1980 | Rudy | | |
| 4,219,945 A | 9/1980 | Rudy | | |
| 4,936,029 A | 6/1990 | Rudy | | |
| 5,042,176 A | 8/1991 | Rudy | | |
| 5,181,717 A * | 1/1993 | Donntag | ................ | A63B 41/08 273/DIG. 8 |
| 5,713,141 A | 2/1998 | Mitchell et al. | | |
| 5,952,065 A | 9/1999 | Mitchell et al. | | |
| 6,013,340 A | 1/2000 | Bonk et al. | | |
| 6,082,025 A | 7/2000 | Bonk et al. | | |
| 6,127,026 A | 10/2000 | Bonk et al. | | |
| 6,203,868 B1 | 3/2001 | Bonk et al. | | |
| 6,321,465 B1 | 11/2001 | Bonk et al. | | |
| 6,663,520 B2 * | 12/2003 | Ou Chen | ............... | A63B 41/00 473/611 |

(Continued)

FOREIGN PATENT DOCUMENTS

| | | | | |
|---|---|---|---|---|
| BR | 102017019815 A2 * | 4/2019 | ............. | A63B 41/02 |
| EP | 2704803 B1 | 2/2019 | | |

OTHER PUBLICATIONS

International Search Report of PCT/US2023/063263, dated May 26, 2023 (3 pages).

(Continued)

*Primary Examiner* — Audrey B. Walter

(74) *Attorney, Agent, or Firm* — BOOKOFF MCANDREWS PLLC

(57) ABSTRACT

A sport ball including a bladder enclosing a volume of gas. The sport ball further includes a casing including a casted material, wherein the casing encloses the bladder.

9 Claims, 16 Drawing Sheets

(56) References Cited

U.S. PATENT DOCUMENTS

| | | | | |
|---|---|---|---|---|
| 6,685,585 | B2 * | 2/2004 | Shishido | A63B 41/08<br>473/605 |
| 6,793,597 | B2 | 9/2004 | Awan | |
| 8,210,973 | B2 | 7/2012 | Rapaport et al. | |
| 8,231,487 | B2 | 7/2012 | Nurnberg et al. | |
| 8,672,784 | B2 * | 3/2014 | Berggren | A63B 45/00<br>473/610 |
| 9,919,483 | B2 * | 3/2018 | Nürnberg | B29C 70/88 |
| 10,195,492 | B2 * | 2/2019 | Campbell | A63B 43/00 |
| 2004/0213984 | A1 * | 10/2004 | Avis | A63B 41/08<br>428/72 |
| 2006/0217219 | A1 * | 9/2006 | Lin | A63B 41/10<br>473/605 |
| 2007/0117662 | A1 | 5/2007 | Ma | |
| 2008/0139349 | A1 * | 6/2008 | Ou | A63B 45/00<br>473/604 |
| 2009/0325745 | A1 * | 12/2009 | Rapaport | B32B 27/08<br>473/604 |
| 2009/0325746 | A1 * | 12/2009 | Raynak | A63B 41/085<br>473/605 |
| 2016/0089580 | A1 | 3/2016 | Nürnberg | |
| 2017/0050089 | A1 * | 2/2017 | Olivares Velasco | A63B 45/00 |
| 2017/0120497 | A1 * | 5/2017 | Lin | B29C 48/17 |
| 2018/0200969 | A1 | 7/2018 | Nürnberg | |

OTHER PUBLICATIONS

FIFA Quality Programme for Footballs (outdoor, futsal and beach soccer footballs) Testing Manual, Oct. 1, 2022, Version 1.1 (21 pages).

* cited by examiner

SPORT BALL

CROSS-REFERENCE TO RELATED APPLICATION(S)

This application claims priority to U.S. Provisional Application No. 63/314,604, filed Feb. 28, 2022, and U.S. Provisional Application No. 63/317,736, filed Mar. 8, 2022, the entireties of which are incorporated herein by reference.

FIELD

The present disclosure relates generally to inflatable sports balls, and more particularly to a method of manufacturing an inflatable sports ball.

BACKGROUND

This section provides background information related to the present disclosure which is not necessarily prior art.

A variety of inflatable sport balls, such as a soccer ball, conventionally exhibit a layered structure that includes a casing, an intermediate layer, and a bladder. The casing forms an exterior layer of the sport ball and is generally formed from a plurality of durable, wear-resistant panels joined together along abutting edges (e.g., with stitching or adhesives). Although panel configurations may vary significantly, the casing of a traditional soccer ball includes thirty-two panels, twelve of which have a pentagonal shape and twenty of which have a hexagonal shape. The intermediate layer forms a middle layer of the sport ball and is positioned between the bladder and the casing to restrict expansion of the bladder. The bladder, which generally has an inflatable configuration, is located within the intermediate layer to provide an inner layer of the sport ball. In order to facilitate inflation (i.e., with air), the bladder generally includes a valved opening that extends through each of the intermediate layer and casing, thereby being accessible from an exterior of the sport ball.

BRIEF DESCRIPTION OF THE DRAWINGS

The foregoing Summary and the following Detailed Description will be better understood when read in conjunction with the accompanying figures.

Corresponding reference numerals indicate corresponding parts throughout the several views of the drawings.

DETAILED DESCRIPTION

Figure 1:
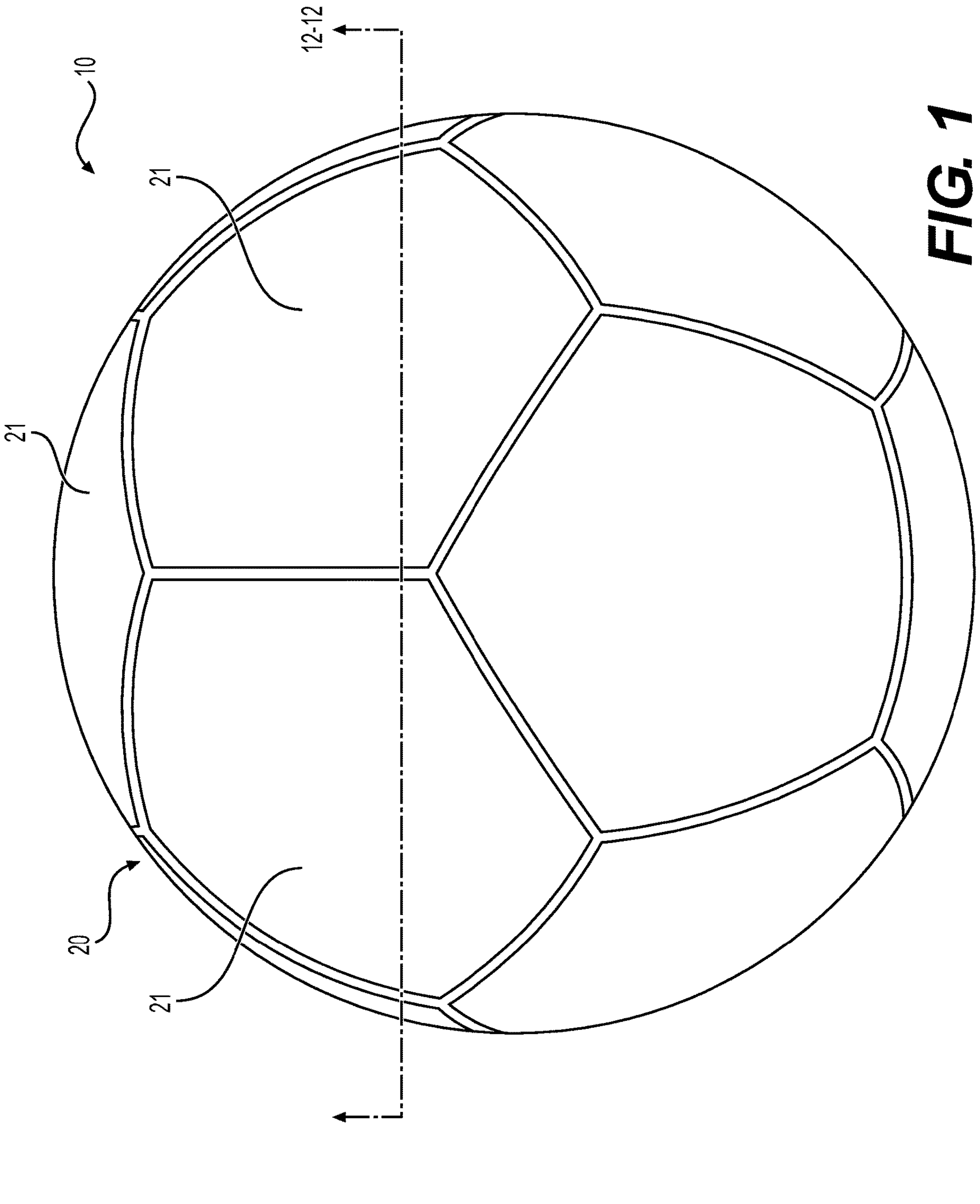
FIG. 1 is a perspective view of a sport ball.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range. All references referred to are incorporated herein in their entirety.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward,"

"top," "bottom," etc., are used descriptively relative to the figures, and do not represent limitations on the scope of the invention, as defined by the claims.

In the discussion that follows, terms "about," "approximately," "substantially," and the like, when used in describing a numerical value, denote a variation of +/−10% of that value, unless specified otherwise.

The following discussion and accompanying figures disclose various bladder configurations for a sport ball. Although the sport ball is primarily discussed and depicted in relation to a soccer ball, concepts associated with the sport ball may be applied to a variety of other types of inflatable sport balls. In addition to a soccer ball, therefore, concepts discussed herein may be incorporated into basketballs, footballs (for either American football or rugby), and volleyballs, for example.

Sport Ball Configurations

Figure 2:
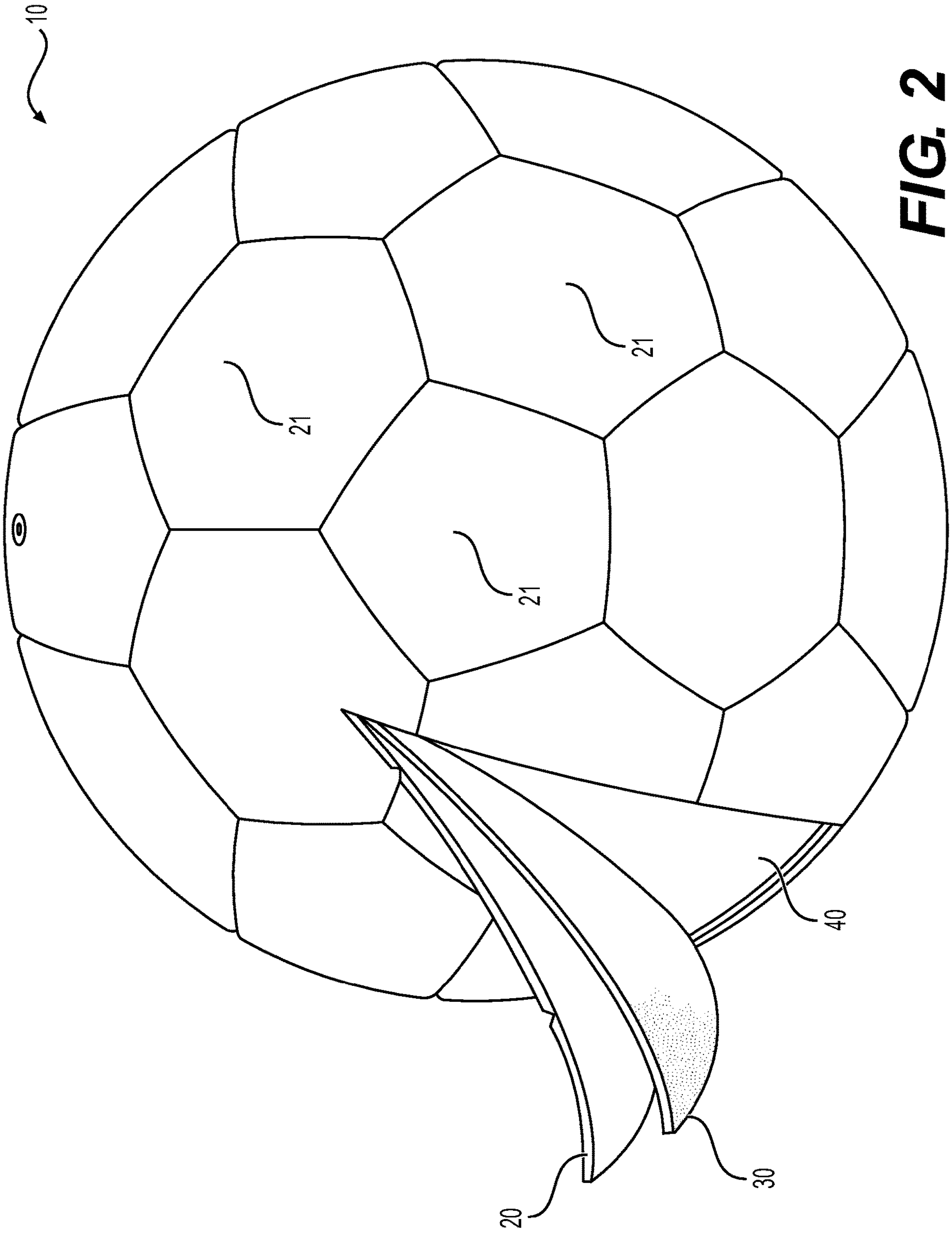
FIG. 2 is another perspective view of the sport ball of FIG. 1 with internal layers revealed.
Figure 3:
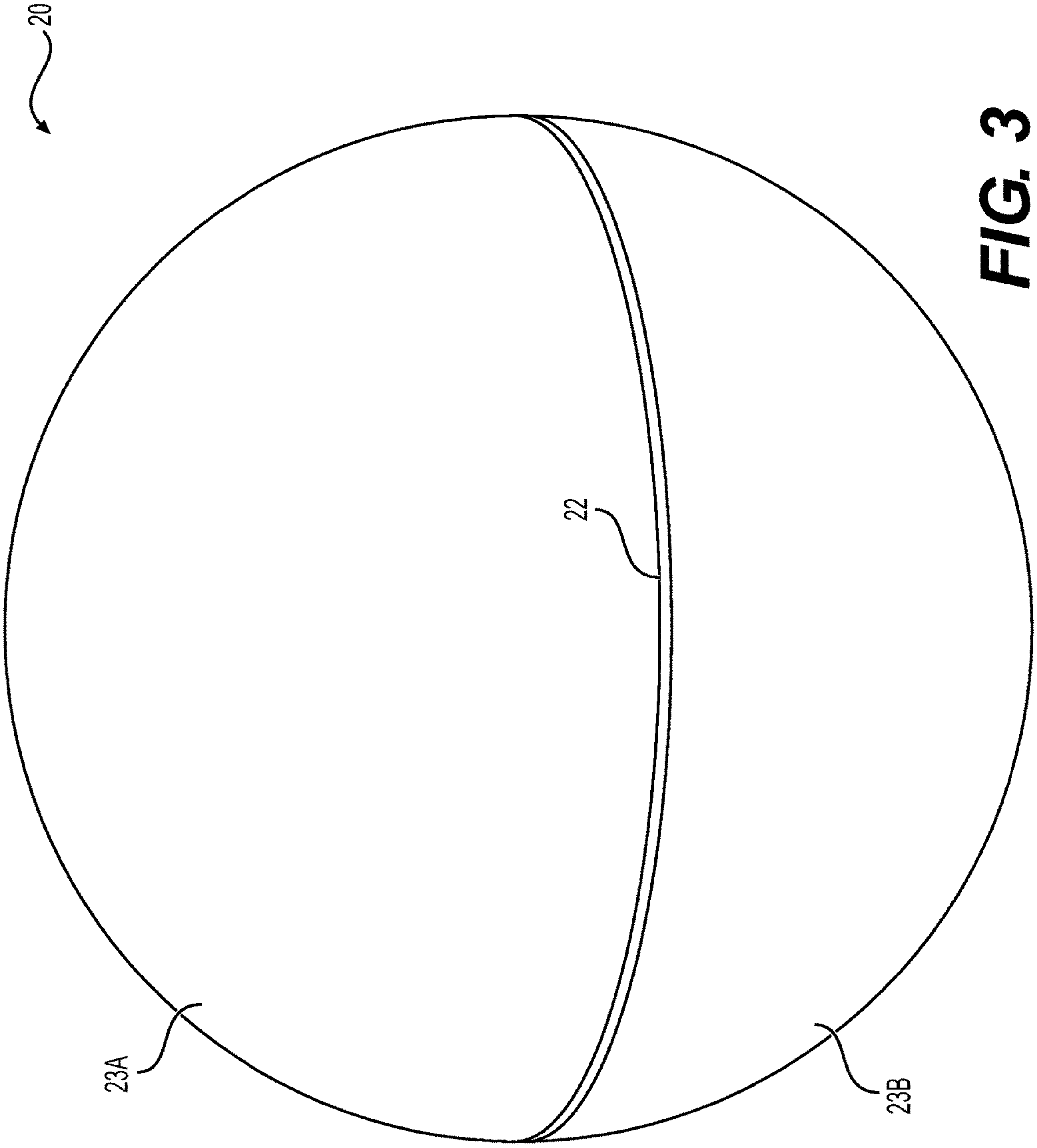
FIG. 3 is a perspective view of a casing of the sport ball of FIG. 1.
Figure 3A:
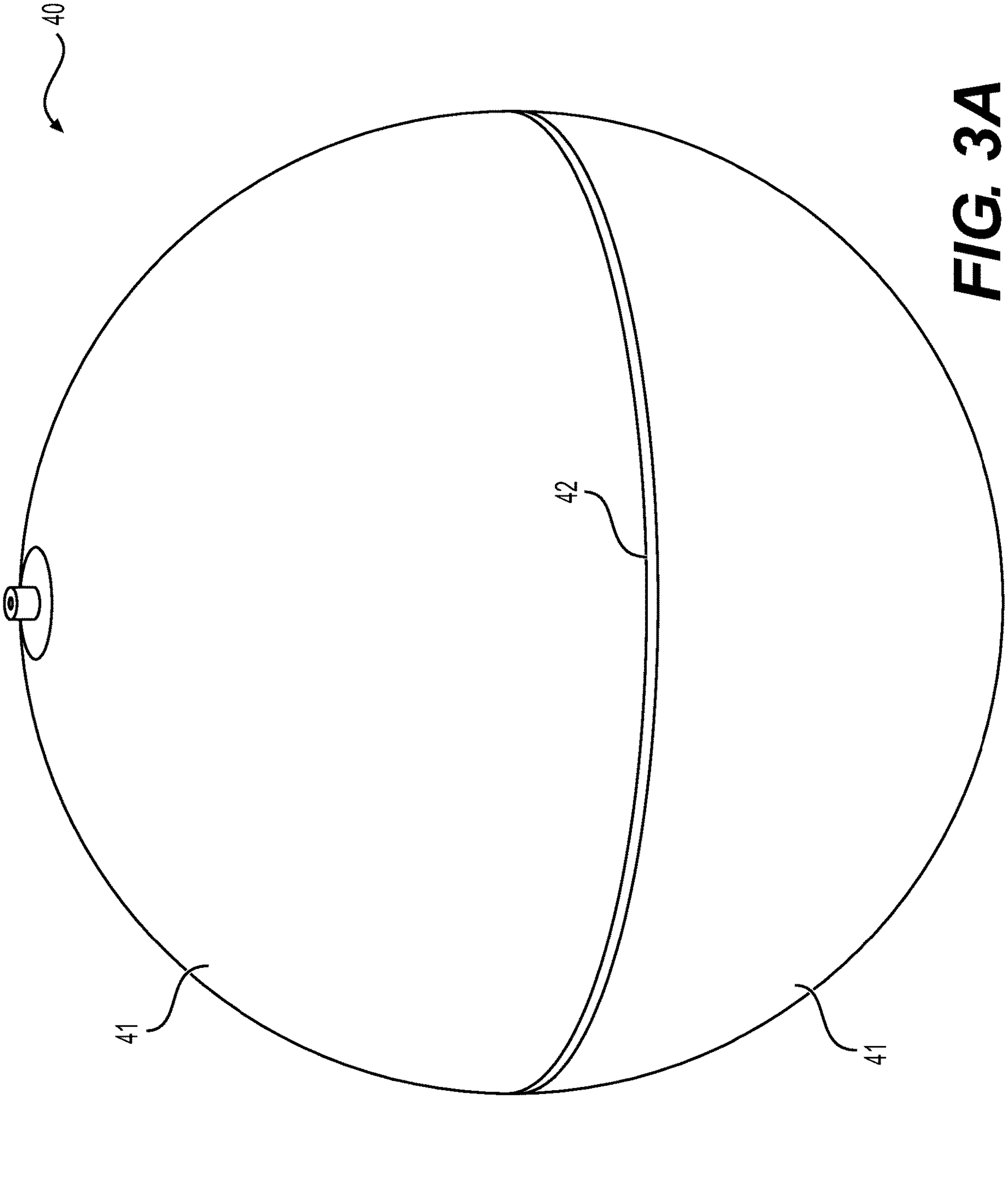
FIG. 3A is a perspective view of a bladder of the sport ball of FIG. 1.
Figure 4A:
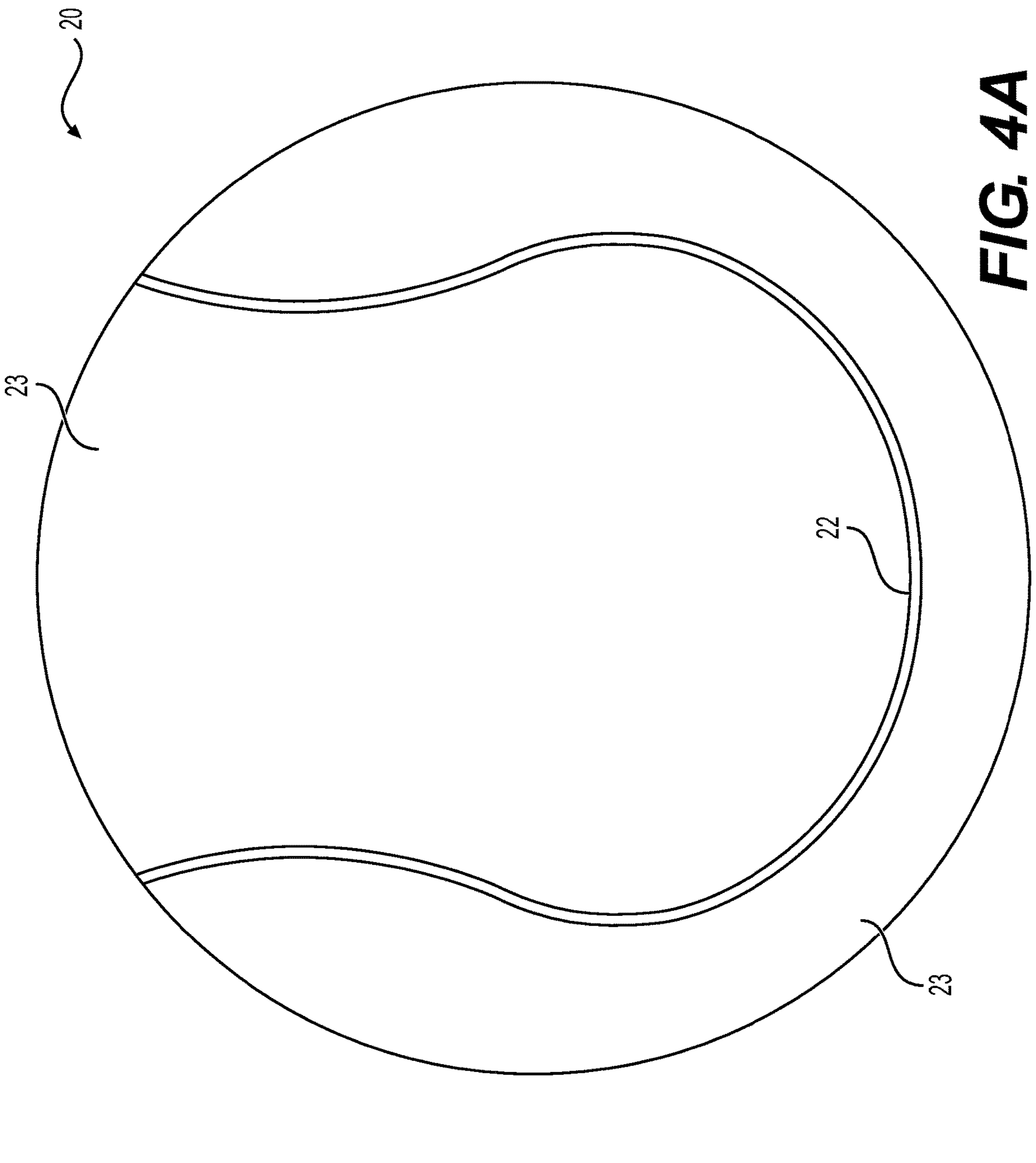
FIG. 4A is a perspective view of an alternative configuration of the casing of FIG. 3.
Figure 4B:
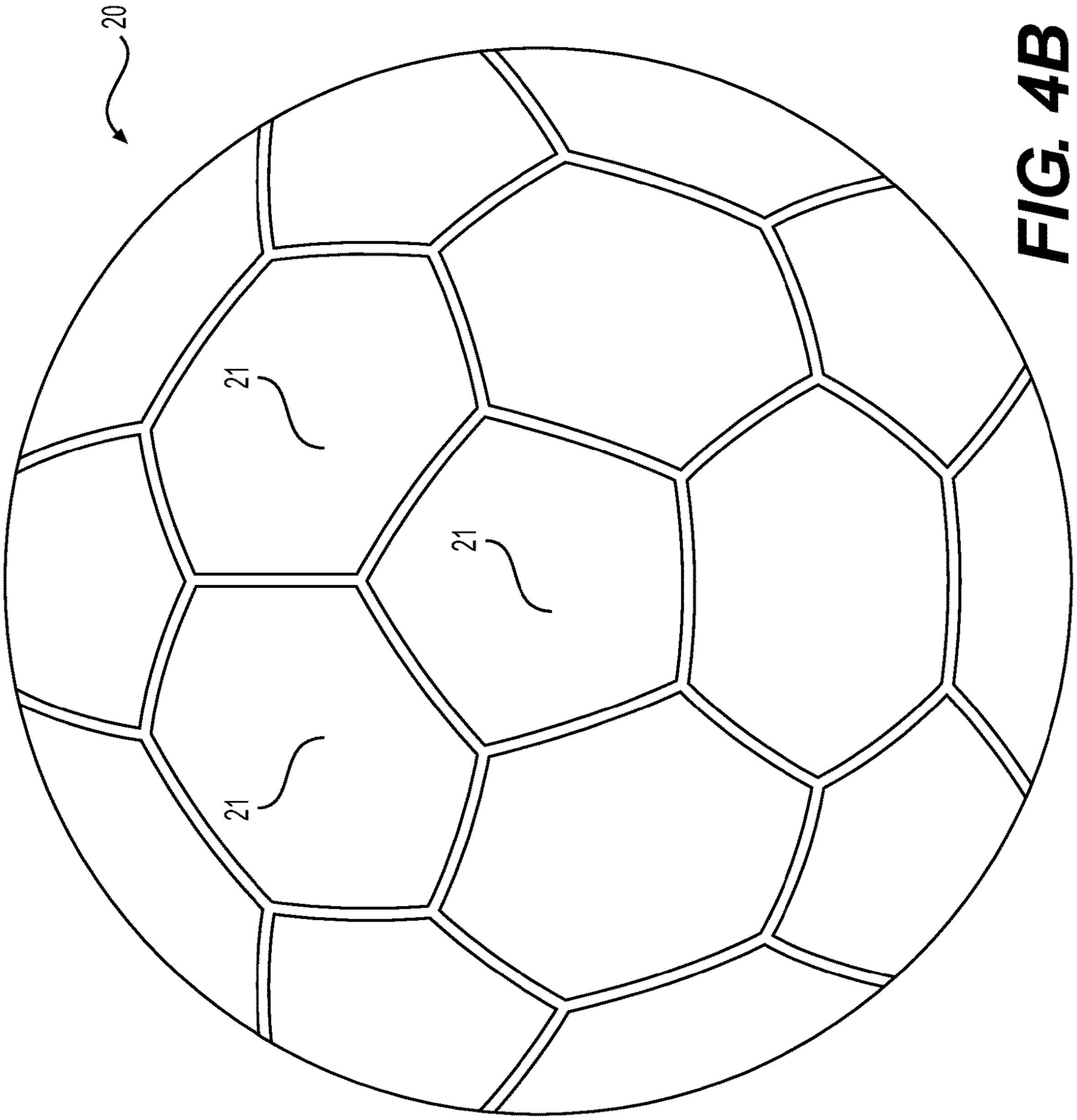
FIG. 4B is a perspective view of an alternative configuration of the casing of FIG. 3.
Figure 4C:
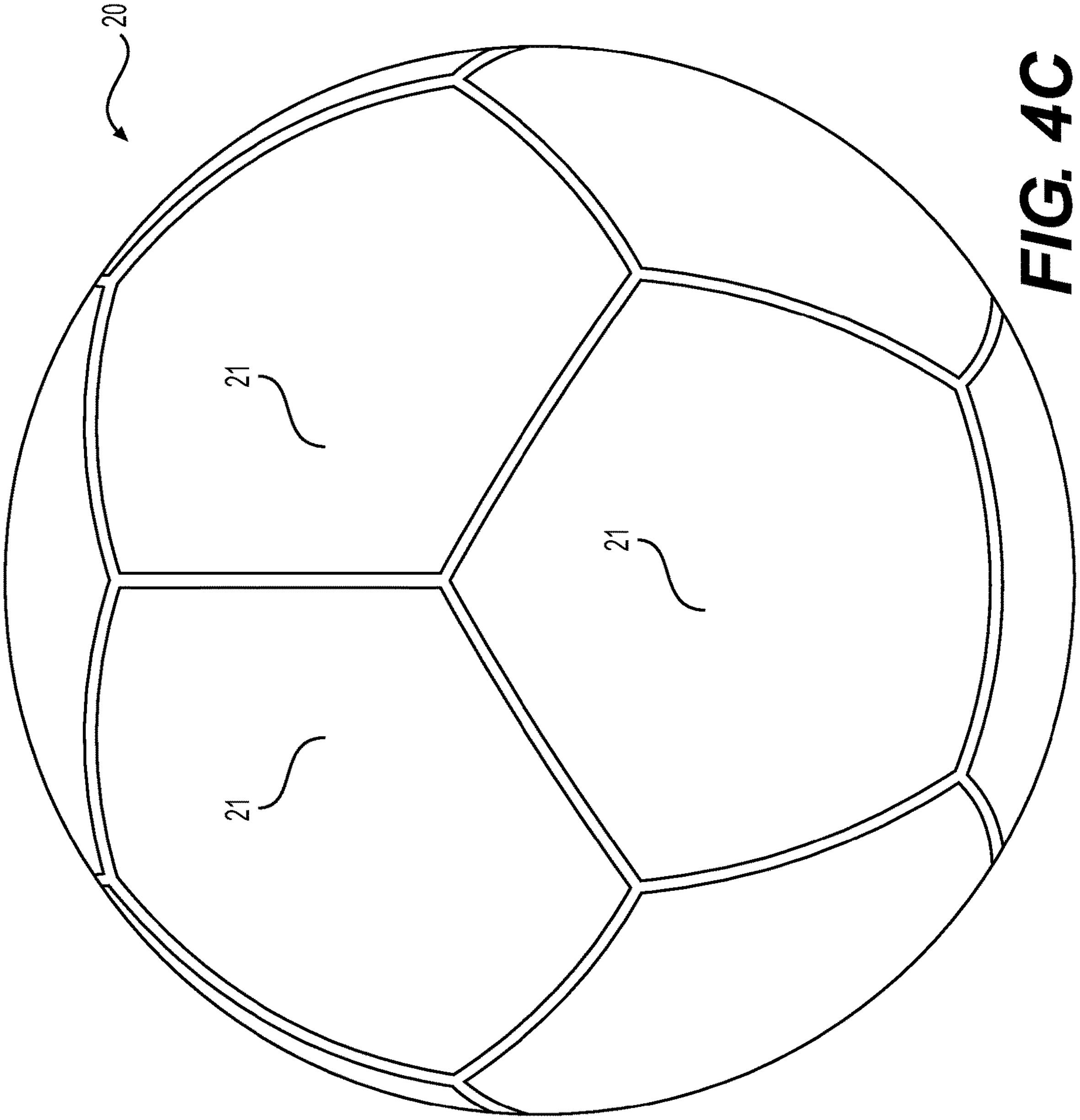
FIG. 4C is a perspective view of an alternative configuration of the casing of FIG. 3.
Figure 4D:
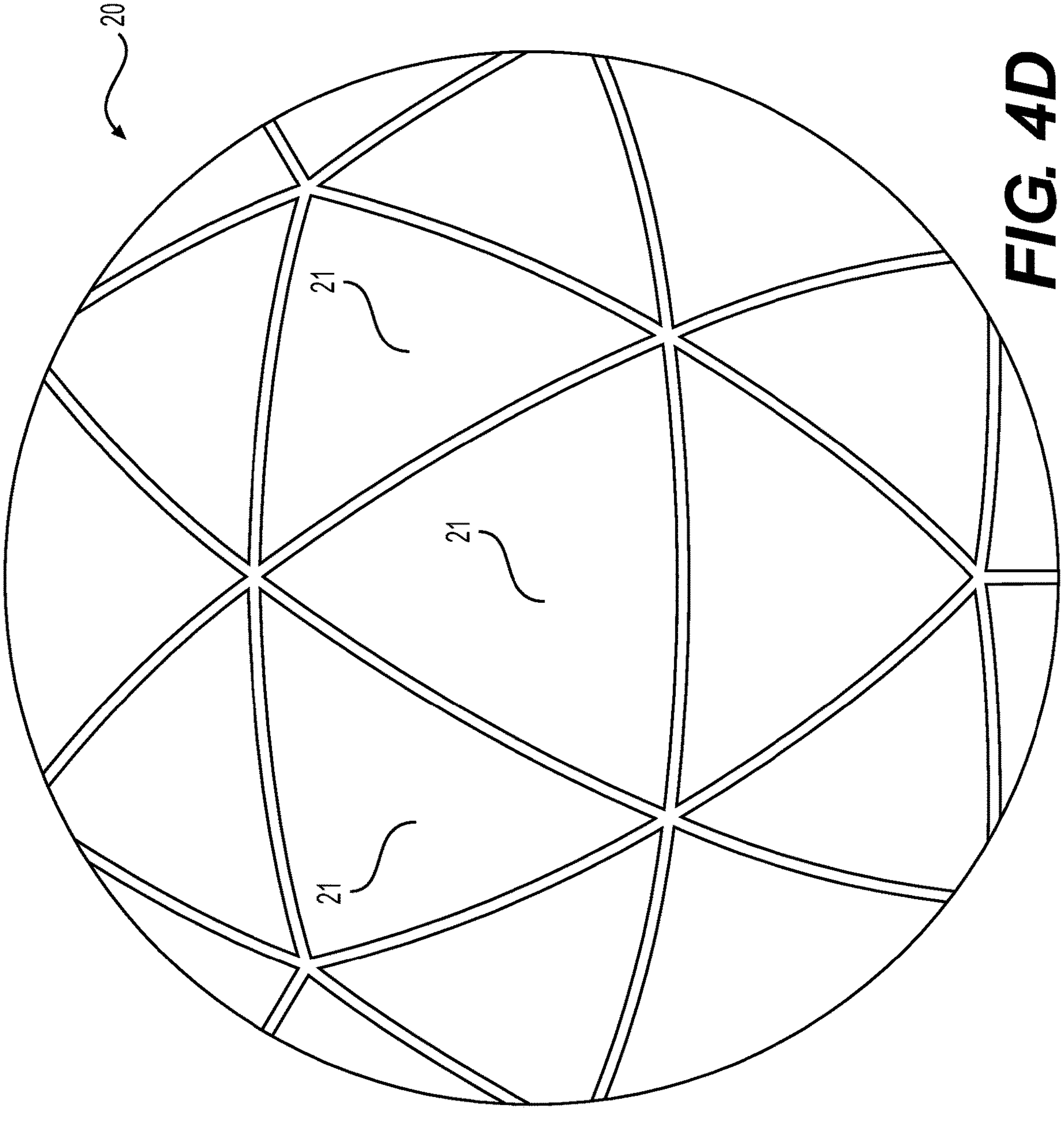
FIG. 4D is a perspective view of an alternative configuration of the casing of FIG. 3.
Figure 4E:
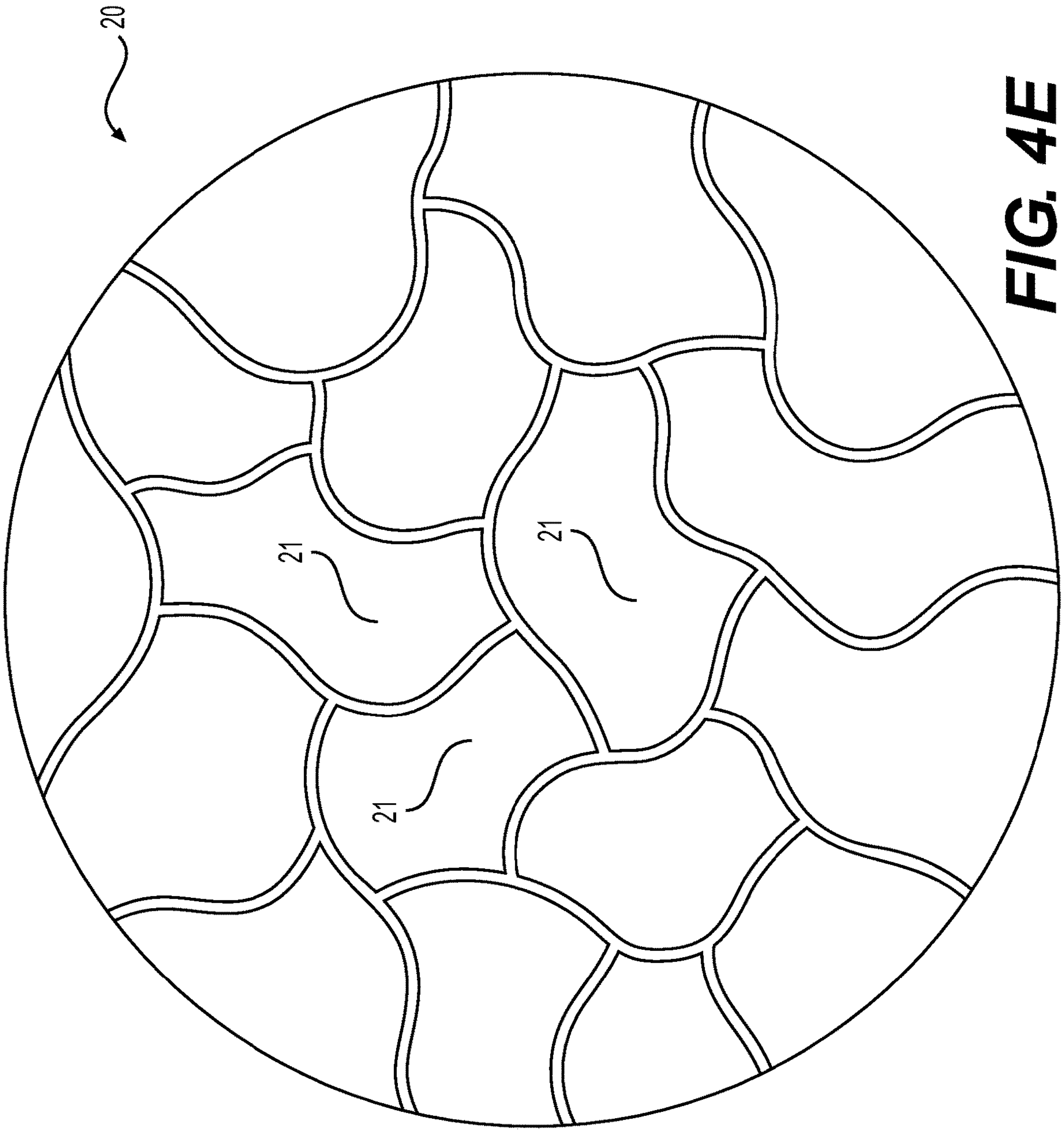
FIG. 4E is a perspective view of an alternative configuration of the casing of FIG. 3.

Referring to FIGS. 1-3, a sport ball 10 may be, for example, a soccer ball. Ball 10 may have a layered structure that includes a casing 20 that encloses (e.g. substantially or completely) an intermediate layer 30 and a bladder 40.

A plurality of casing panels 21 may be attached to the outer surface of casing 20, such that casing panels 21 form the exterior most portion of the sport ball 10. Alternatively, casing 20 may form an exterior of ball 10 and may have the plurality of casing panels 21 integrated thereon. Casing panels 21 may be attached in any suitable fashion. For example, casing panels 21 may be attached by adhesive. Casing panels 21 may include one or more elements including textures, shapes, ribs, channels, seams, smooth surfaces, or any other elements required for imparting, e.g., aerodynamic or other characteristics to a sport ball. It is contemplated that the one or more elements may be integrated to the casing 20. In such an embodiment, casing panels 21 would not be attached to the casing 20. In a separate process, casing 20 may have the necessary sport characteristic integrated thereon removing the utility of additional exterior casing panels 21. Casing 20 may be formed by the manufacturing process described herein (shown in FIGS. 7-10), and may be comprised of a casting or casted material. In some embodiments, the casting or casted material may include a single polyurethane foam layer (or multiple polyurethane foam layers). Casing 20 may have a thickness value ranging from 3 mm to 6 mm. In an exemplary embodiment, casing 20 may have a thickness value of 5 mm.

Casing 20 may be formed by two hemispherical halves 23A and 23B (shown in FIG. 3) that are joined by a single circumferential seam 22, thereby imparting a generally or substantially spherical shape to bladder. Casing 20 may have disposed on its outer surface a plurality of shapes. The shapes may be equilateral hexagons and/or equilateral pentagons. Casing panels 21 may take the shape of equilateral hexagons and equilateral pentagons. Casing panels 21 may have a corresponding shape to that of the outer surface of casing 20. In further configurations of ball 10, however, casing panels 21 may have non-equilateral shapes, casing panels 21 may have concave or convex edges (when viewed from the center of the given panels 21), and selected casing panels 21 may be formed integral with adjacent casing panels 21 to form bridged panels. Casing panels 21 may also have a variety of other shapes (e.g., triangular, square, rectangular, trapezoidal, round, oval, non-geometrical). Casing panels 21 may also exhibit non-regular or non-geometrical shapes. Casing panels 21 may have a thickness value between 0.5 mm and 1 mm. In an exemplary embodiment, casing panels 21 may have a thickness of 0.75 mm.

A wide range of polymer materials may be utilized for bladder 40 and casing 20. In selecting materials for bladder 40 and/or casing 20, engineering properties of the material (e.g., tensile strength, stretch properties, fatigue characteristics, dynamic modulus, and loss tangent) as well as the ability of the material to prevent the diffusion of the fluid contained by bladder 40 may be considered. Bladder panels 41 may be bonded together at seams 42. Although adhesives may be utilized to form seams 42, heat bonding or radio frequency bonding may be utilized when bladder panels 41 are formed from a thermoplastic material. As example of a suitable thermoplastic material is thermoplastic polyurethane. Given that ball 10 may be utilized in damp or humid conditions and an interior of ball 10 may be exposed to water, an ether-based thermoplastic polyurethane that is resistant to fungus may be advantageous.

In addition to thermoplastic polyurethane, examples of polymer materials that may be suitable for bladder 40 include urethane, polyester, polyester polyurethane, and polyether polyurethane. Bladder 40 may also be formed from a material that includes alternating layers of thermoplastic polyurethane and ethylene-vinyl alcohol copolymer, as disclosed in U.S. Pat. Nos. 5,713,141 and 5,952,065 to Mitchell, et al. A variation upon this material may also be utilized, wherein a center layer is formed of ethylene-vinyl alcohol copolymer, layers adjacent to the center layer are formed of thermoplastic polyurethane, and outer layers are formed of a regrind material of thermoplastic polyurethane and ethylene-vinyl alcohol copolymer. Another suitable material for bladder 40 is a flexible microlayer membrane that includes alternating layers of a gas barrier material and an elastomeric material, as disclosed in U.S. Pat. Nos. 6,082,025 and 6,127,026 to Bonk, et al. Additional suitable materials are disclosed in U.S. Pat. Nos. 4,183,156 and 4,219,945 to Rudy. Further suitable materials include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340; 6,203,868; and 6,321,465 to Bonk, et al.

Bladder 40 may enclose a fluid pressurized between zero and three-hundred-fifty kilopascals (i.e., approximately fifty-one pounds per square inch) or more. In addition to air and nitrogen, the fluid contained by bladder 40 may include other gases capable of providing a pressurized fluid to the bladder 40.

In alternative embodiments, the casing 20 may include other materials that are generally durable and wear resistant, as well as materials that impart characteristics improving flight time and other aerodynamic properties. In alternative embodiments, each of casing panels 21 may have a layered configuration that combines two or more materials. For example, an exterior portion of each casing panel 21 may be formed from a polyurethane layer, and an interior portion of each casing panel 21 may be formed from a polymer foam layer.

Referring to FIGS. 4A-4E, an outer surface of casing 20 (or casing panels 21) may have hexagonal and/or pentagonal shapes, triangular shapes, or irregular shapes.

Referring back to FIGS. 1-3 and 3A, intermediate layer 30 may form a middle layer of ball 10 and may be positioned radially between bladder 40 and casing 20. Intermediate layer 30 may be formed from materials with a limited degree of stretch in order to restrict expansion of the bladder 40, but may have a variety of configurations or purposes. For example, intermediate layer 30 may be formed from (i) a thread, yarn, or filament that is repeatedly wound around bladder 40 in various directions to form a mesh that covers substantially all of bladder 40; (ii) a plurality of generally flat or planar textile elements stitched together to form a structure that extends around bladder 40; (iii) a plurality of generally flat or planar textile strips that are impregnated with latex and placed in an overlapping configuration around bladder 40; or (iv) a substantially seamless spherically-shaped textile. In some embodiments, intermediate layer 30 may be absent from ball 10.

Bladder 40 may be located within intermediate layer 30 to provide an inner portion of ball 10. Bladder 40 may be pressurized such that the pressurization induces ball 10 to take on a substantially spherical shape. More particularly, pressure within bladder 40 may cause bladder 40 to place an outward force upon intermediate layer 30. In turn, intermediate layer 30 may place an outward force upon casing 20. In order to limit expansion of bladder 40 and also limit tension in casing 20, intermediate layer 30 may be formed from a material that has a limited degree of stretch. In other words, bladder 40 places an outward force upon intermediate layer 30, but the stretch characteristics of intermediate layer 30 effectively prevent the outward force from inducing significant tension in casing 20. Accordingly, intermediate layer 30 restrains pressure from bladder 40, while permitting outward forces to induce a substantially spherical shape in casing 20, thereby imparting a substantially spherical shape to ball 10.

Bladder 40 may incorporate two hemispherical bladder panels 41 that are joined by a single seam 42, thereby imparting a generally spherical shape to bladder. Bladder panels 41 may be planar polymer elements that are joined at the seam 42 and then pressurized to cause expansion and induce bladder 40 to take on the generally spherical shape. Additionally, the bladder panels 41 may be polymer elements that are thermoformed to impart a rounded or hemispherical configuration, joined at the seam 42, and then pressurized to induce bladder 40 to take on the generally spherical shape. Accordingly, the bladder panels 41 may be planar polymer elements or rounded polymer elements when incorporated into bladder 40.

Bladder 40 may be a sealed and valveless structure. That is, a polymer material forming bladder 40 is sealed to substantially prevent a fluid located within bladder 40 from escaping to an exterior of ball 10. Moreover, in some embodiments, bladder 40 does not incorporate a valve that permits a gas to be injected into bladder 40 or removed from bladder 40, thereby providing the valveless structure. Accordingly, bladder 40 may be pressurized during the manufacturing process and will remain pressurized for the useful life of ball 10. Although discussed above as having a sealed and valveless configuration, some configurations of bladder 40 may incorporate a valve that permits adjustments to the pressure of the fluid.

Figure 5:
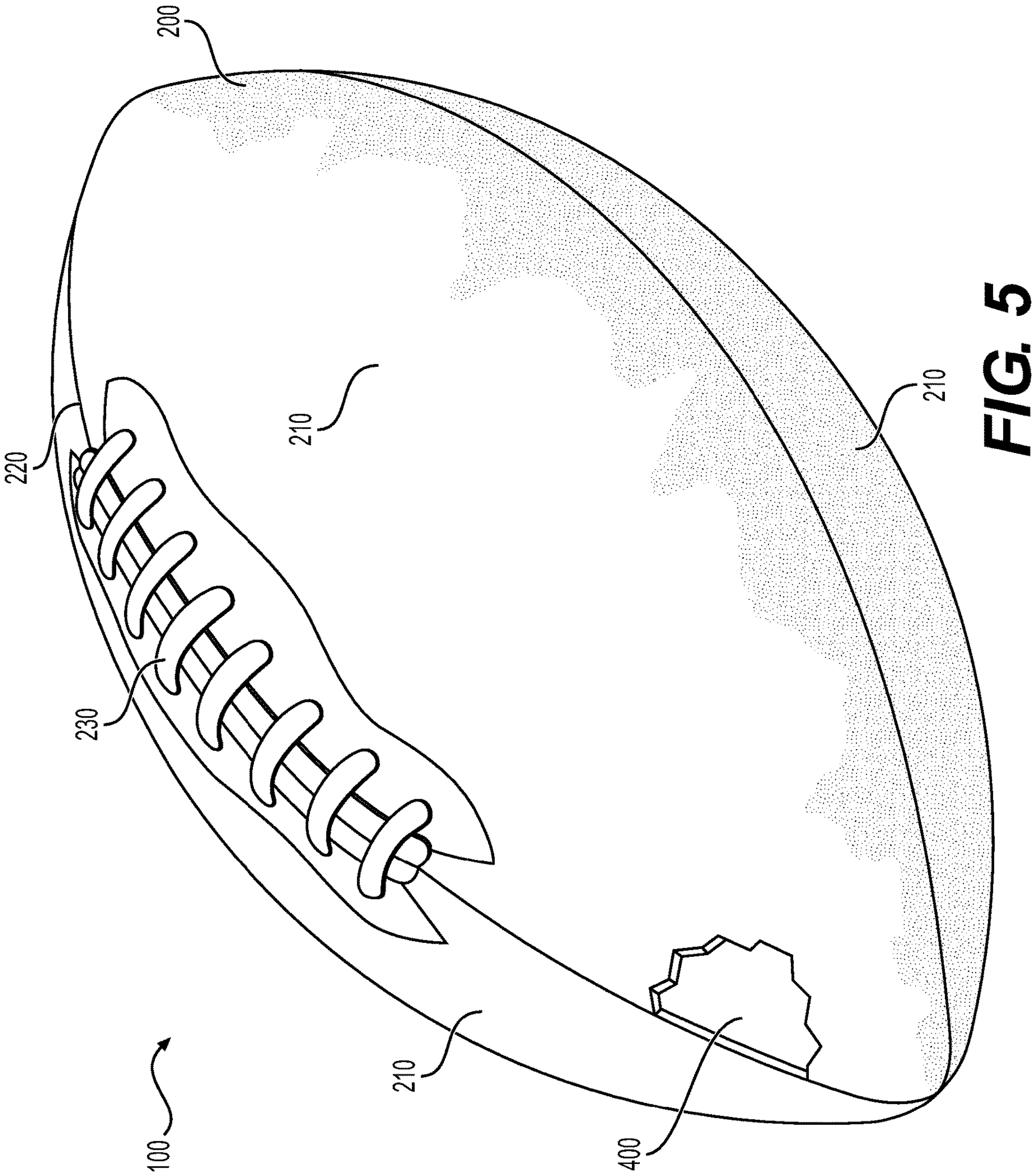
FIG. 5 is a perspective view of an alternative sport ball.
Figure 6:
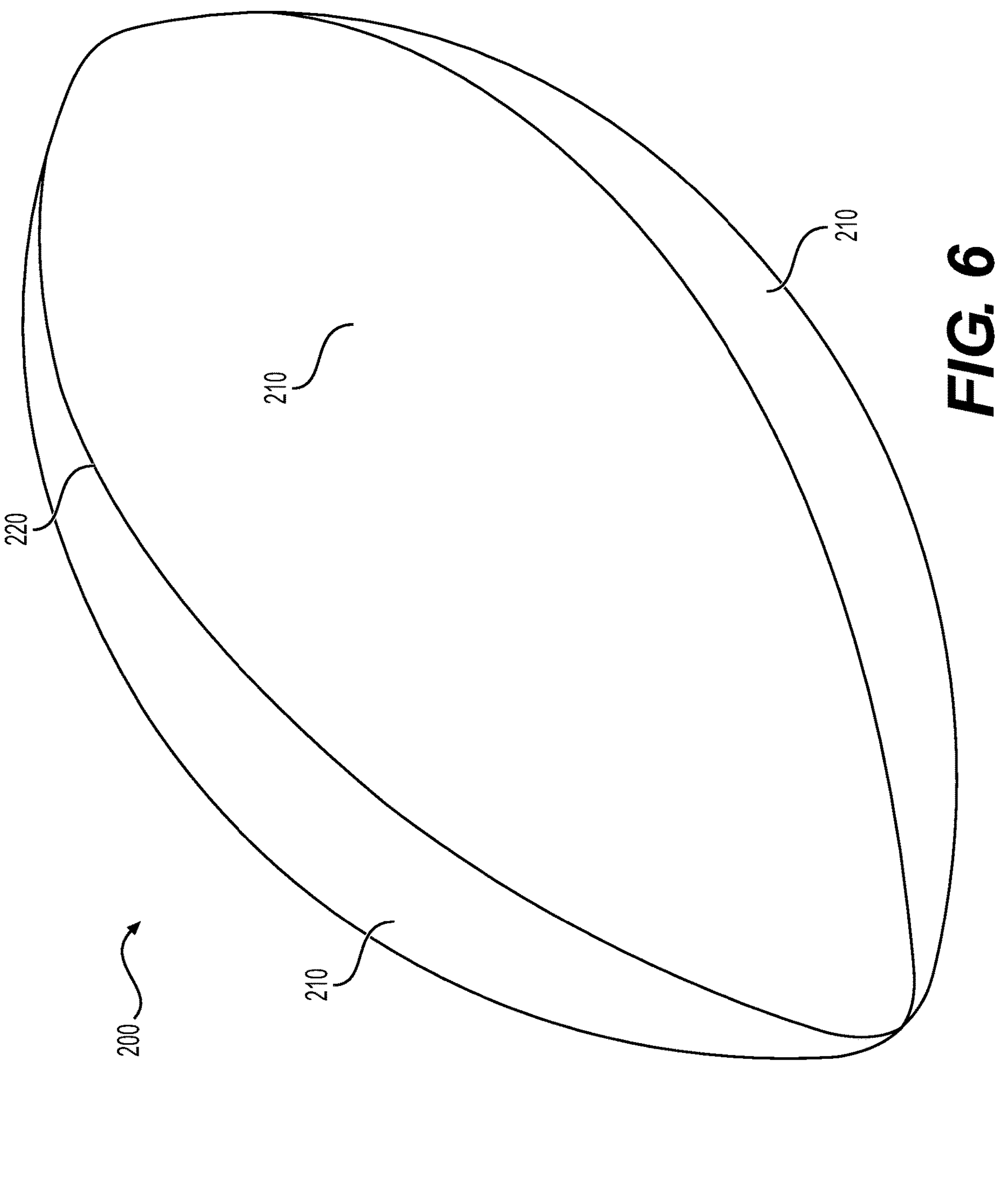
FIG. 6 is a perspective view of a casing of the sport ball of FIG. 5.

Although ball 10 may have the configuration of a soccer ball, concepts associated with ball 10 may be incorporated into other types of sport balls. Referring to FIGS. 5-6, a sport ball 100 is depicted as having the configuration of a football. A casing 200 forms an exterior of ball 100 and may comprise various panels 210 that are joined by seams 220. Laces 230 may also extend along one or more seams 220. It is contemplated that casing 200 may be seamless in association with sport ball 100. A bladder 400, may be located within casing 200 and may be formed from various bladder panels that are joined at seams. Whereas ball 10, casing 20, and bladder 40 may each have generally spherical shapes, ball 100, casing 200, and bladder 400 may each have an oblong shape that is characteristic of a football. Casing 200 may be textured so as to, for example, impart particular characteristics such as grip to sport ball 100. In addition to soccer balls and footballs, concepts associated with balls 10 and 100 may be incorporated into basketballs, footballs for rugby, and volleyballs, for example.

Thermoforming Manufacturing Process

Referring to FIGS. 7-8, 9A-9G, and 10, a thermoforming process 1000 may form casing 20 from a casting material, e.g. a polyurethane mixture or another suitable material for imparting desired characteristics to a sports ball 10. More particularly, the thermoforming process 1000 may (a) impart shape to the polyurethane mixture to form a hemispherical or otherwise curved structure of a first hemispherical half 23A of casing 20, (b) impart shape to another of the polyurethane mixture in order to form a hemispherical or otherwise curved structure of a second hemispherical half 23B of casing 20, and (c) form a seam 22 by bonding peripheries of the first hemispherical half of casing 20 and the second hemispherical half of casing 20 formed from the polyurethane mixture. The thermoforming process 1000 may also involve sealing casing 20. The thermoforming process 1000 is described in further detail below.

Figure 7:
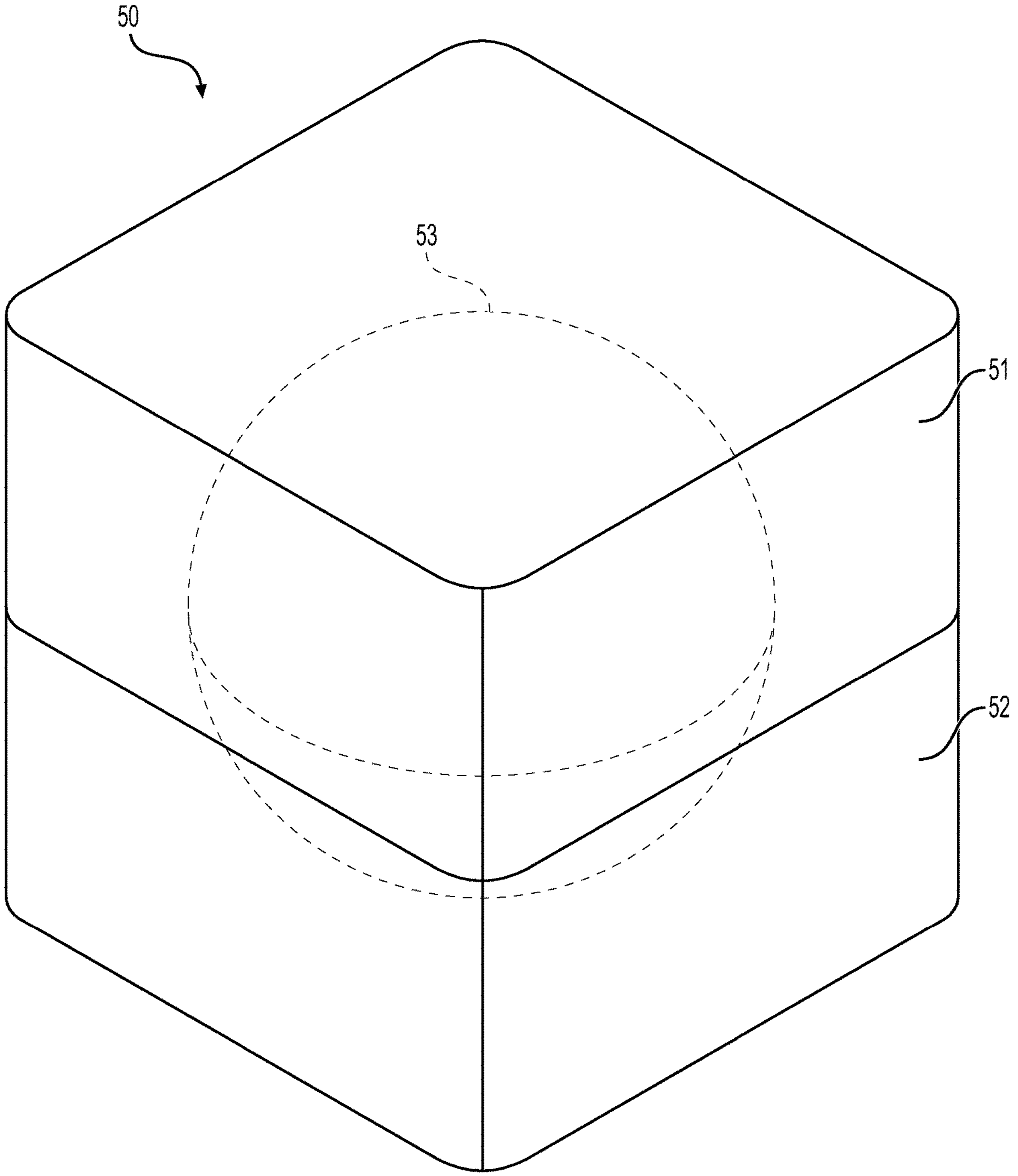
FIG. 7 is a perspective view of a mold for forming the casing depicted in FIG. 3.
Figure 8:
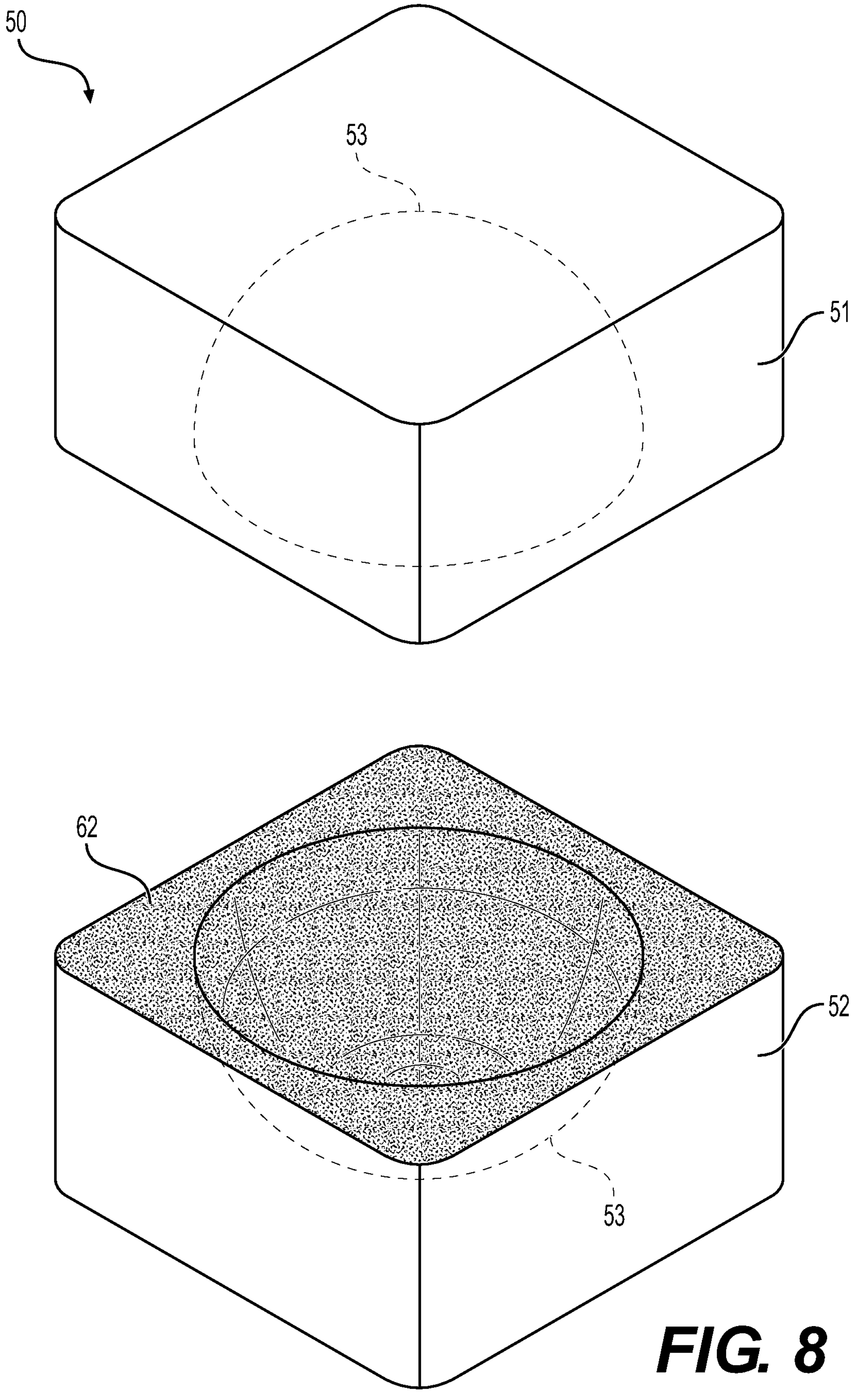
FIG. 8 is an exploded perspective view of the mold of FIG. 7.
Figures 9A, 9B, 9C, 9D:
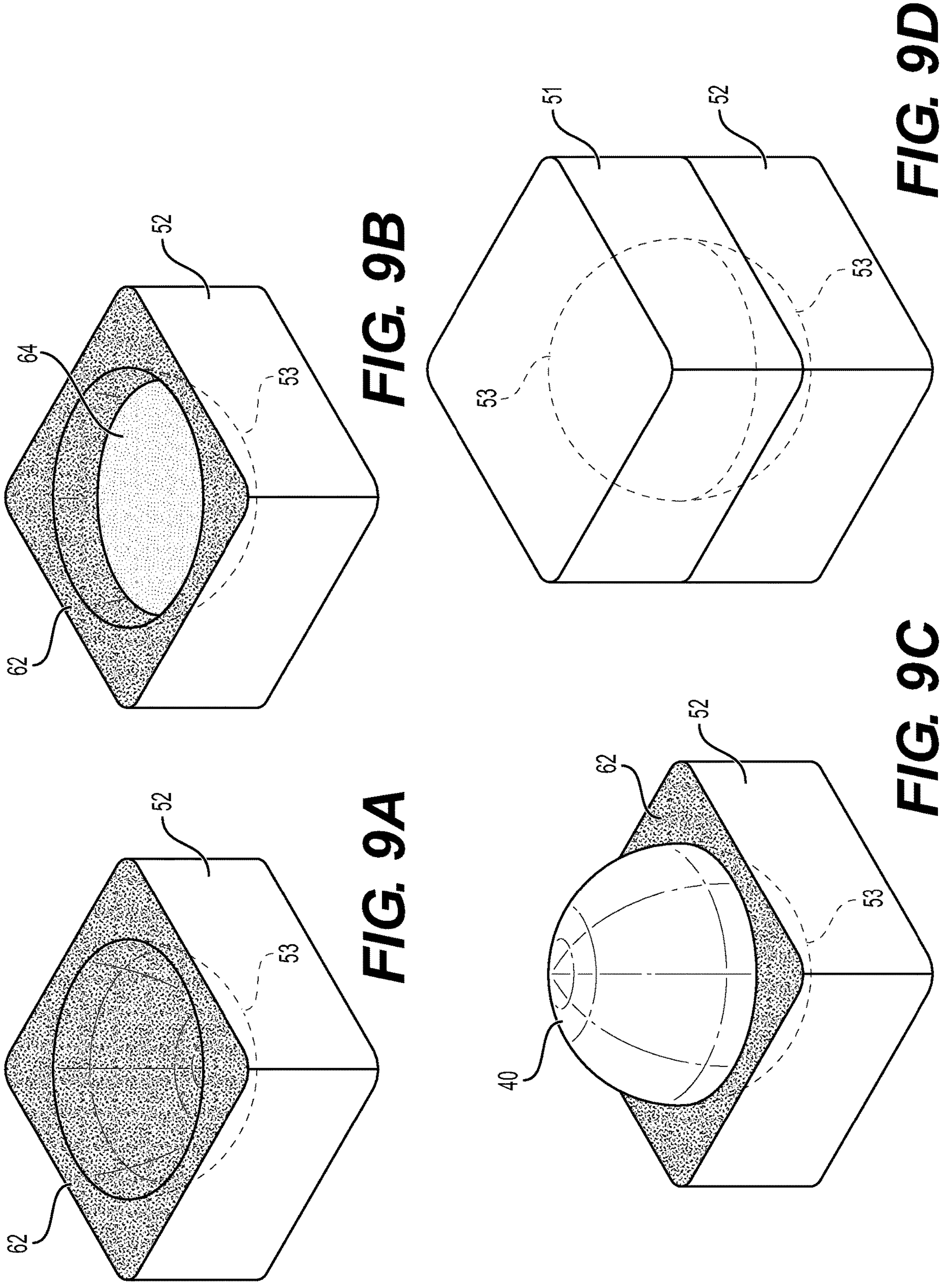
FIG. 9A is a schematic perspective view of a manufacturing process for forming the casing depicted in FIG. 3.
FIG. 9B is a schematic perspective view of a manufacturing process for forming the casing depicted in FIG. 3.
FIG. 9C is a schematic perspective view of a manufacturing process for forming the casing depicted in FIG. 3.
FIG. 9D is a perspective view of the casing and residual portions of the casing following the manufacturing process according to aspects of the present disclosure.
Figure 9E:
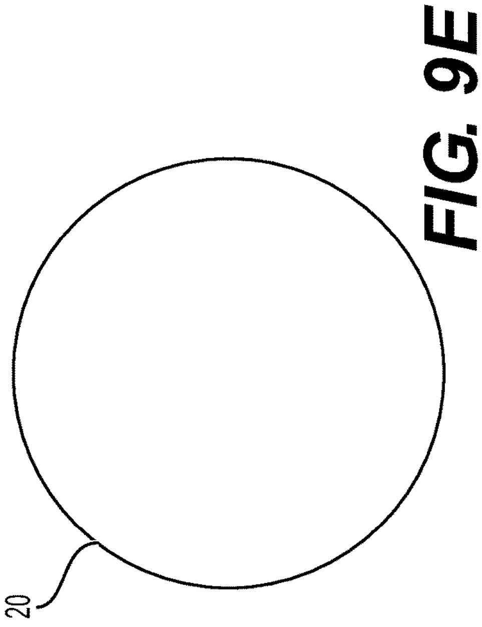
FIG. 9E is a schematic perspective view of a manufacturing process for forming the casing depicted in FIG. 3.
Figure 9F:
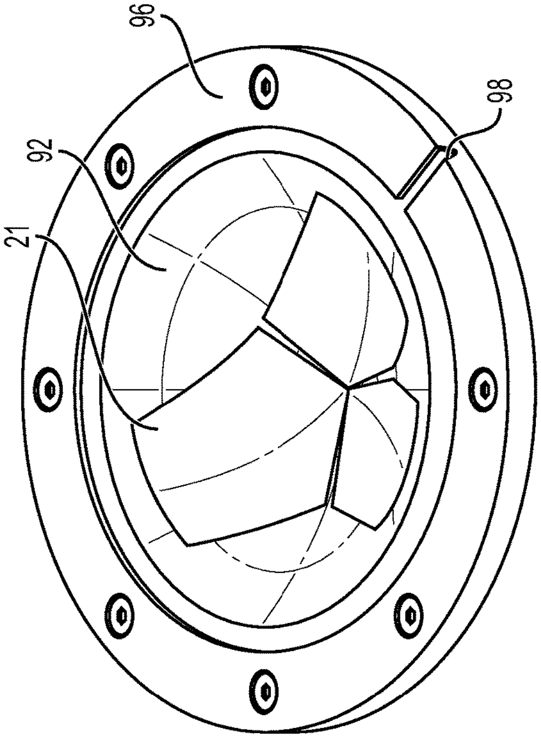
FIG. 9F is a schematic perspective view of a manufacturing process for forming the casing depicted in FIG. 3.
Figure 9G:
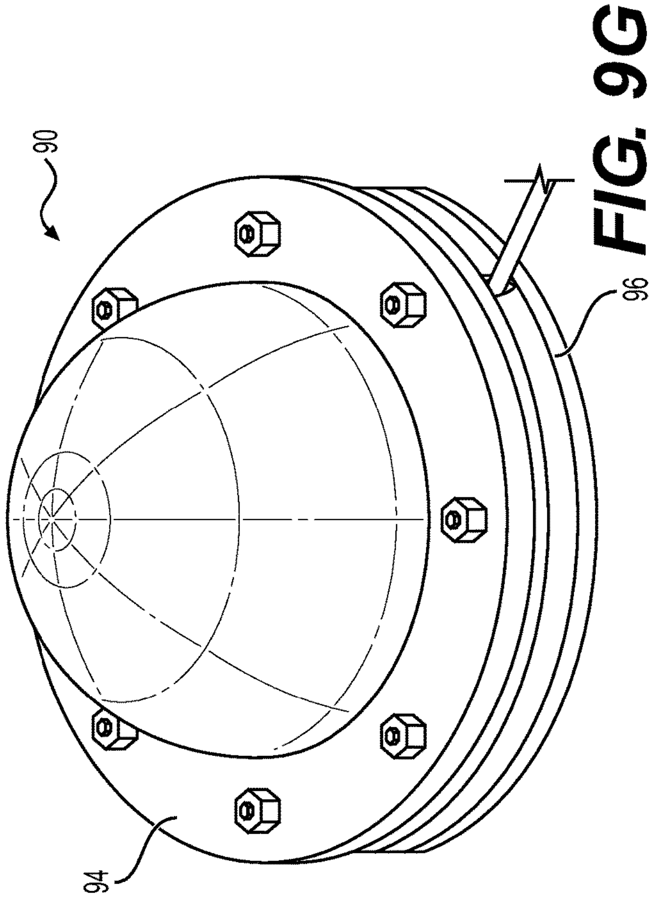
FIG. 9G is a schematic perspective view of a manufacturing process for forming the casing depicted in FIG. 3.
Figure 9H:
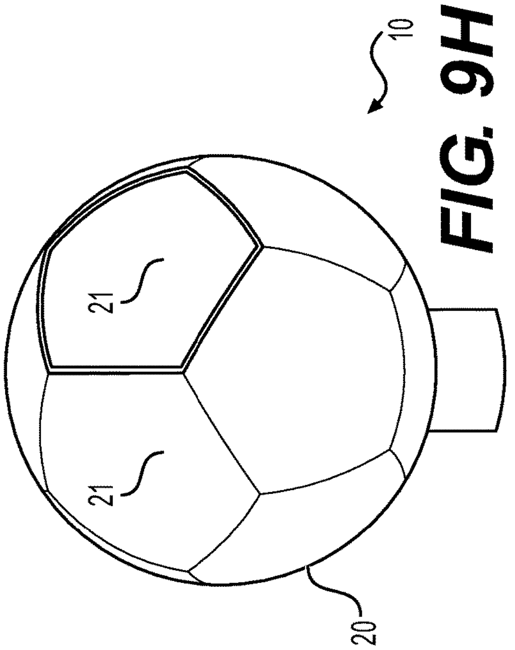

Referring to FIGS. 7 and 8, a mold 50 having an upper mold portion 51 and a lower mold portion 52 may be formed. Each of mold portions 51 and 52 may cooperatively define an internal cavity 53 with the configuration of casing 20. When mold portions 51 and 52 are joined together, cavity 53 may have a generally spherical shape. In alternative embodiments, mold portions 51 and 52 may have disposed therein tooling for shaping casing panels 21.

Figure 10:
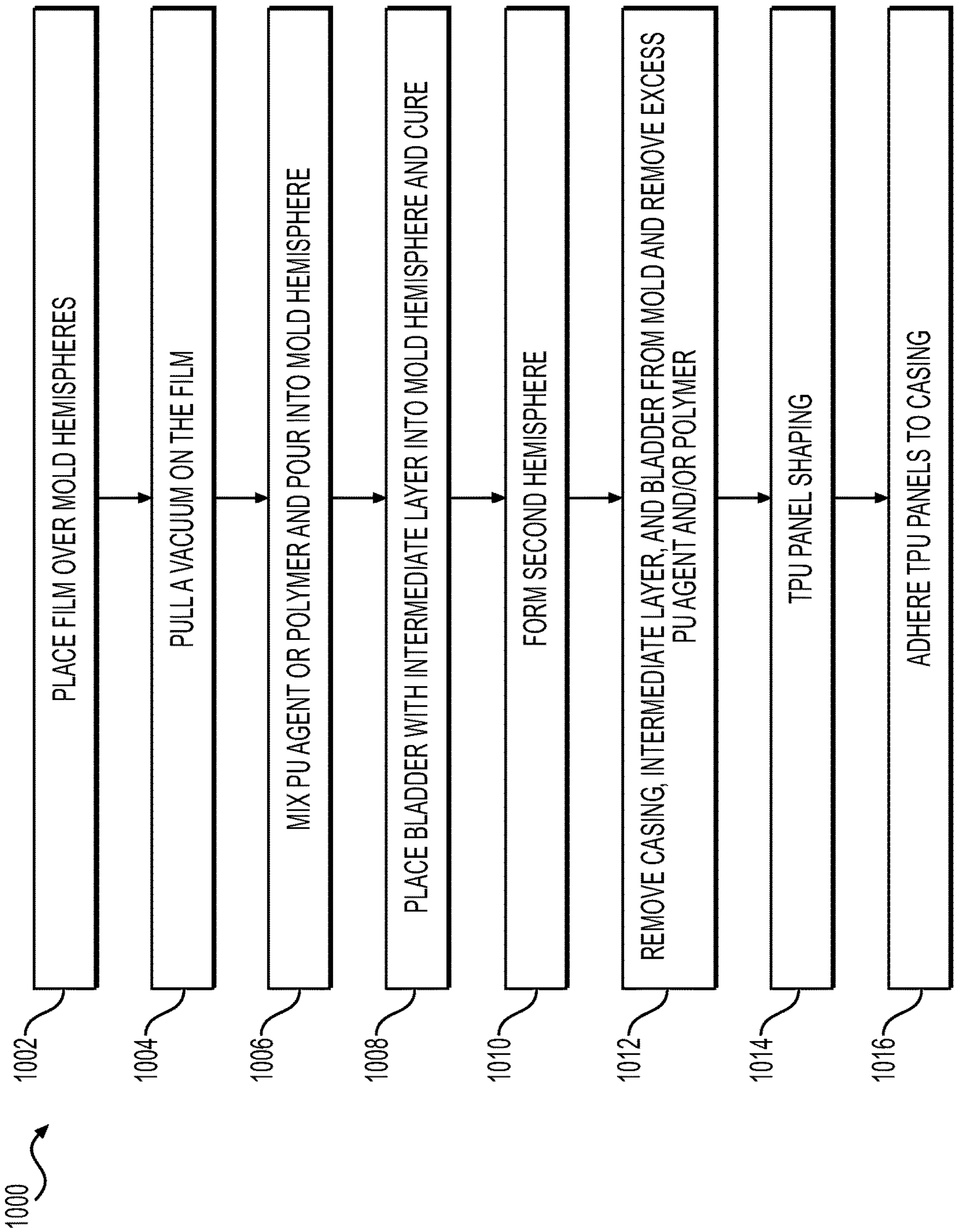
FIG. 10 is a flowchart of an exemplary manufacturing process for forming the casing depicted in FIG. 3.

Referring to FIG. 10, in step 1002, the mold portions 51 and 52 may have removably disposed thereon one or more polymer films 62. The one or more polymer films 62 may be comprised of thermoplastic polyurethane. The one or more polymer films 62 may have a thickness value between 0.2 mm and 0.6 mm. In an exemplary embodiment, the one or more polymer films 62 may have a thickness value of 0.3 mm. Mold portions 51 and 52 may be connected to a vacuum source (not shown). In step 1004, fluid (e.g. air) may be removed from the area between polymer films 62 and mold portions 51 and 52 through various vents, thereby drawing polymer films 62 onto the surfaces of mold portions 51 and 52. That is, at least a partial vacuum may be formed between polymer films 62 and the surfaces of mold 50. As the area between polymer films 62 is pressurized and air is removed from the area between mold 50 and polymer films 62, polymer films 62 may conform to the shape of cavity 53. More specifically, polymer films 62 may stretch, bend, or otherwise conform to extend along the surfaces of cavities 53 and form the general shape of casing 20. Once the vacuum is formed around polymer films 62, in step 1006, a casing (e.g. polyurethane, bio-EVA, thermoplastic polyurethane, or other suitable material) mixture 64 may be delivered within the basin of polymer films 62. Referring to step 1008, the bladder 40, with intermediate layer 30 present therein, may be placed within the cavity 53 of mold portion 51 with casing mixture 64 therein to impart the general shape of the sport ball 10 to the casing mixture 64. Upon insertion of the bladder 40 into the casing mixture 64, the casing mixture 64 may envelop the bladder 40. The casing mixture 64 may then be cured or cast thereby forming the first hemispherical half 23A of casing 20. Upon completion of the curing process for the first hemispherical half 23A, the process may move to step 1010 wherein the previous step for forming the first hemispherical half 23A may then be repeated to form the second hemispherical half 23B of casing 20, intermediate layer 30, and bladder 40. The casing mixture 64 may be delivered to the basin of polymer films 62 within mold portion 52. The two hemispheres from the mold portions 51 and 52 may be mated together such that the mold portion 51, first hemispherical half 23A, containing the bladder 40 with intermediate layer 30 may be attached to the opposing mold portion 52 with the additional casing mixture 64 disposed therein. In other words, the mold hemisphere containing the bladder 40 may be placed in contact with the opposing mold hemisphere such that the exposed portion of the bladder 40 may be placed in the opposing mold hemisphere with the casing mixture 64 disposed therein to form the opposing hemispherical half of casing 20. The mold portions 51 and 52 may be sealed to prevent the casing mixture 64 from escaping the mold 50.

After a predetermined time period, the casing mixture 64 may form casing 20. This may be accomplished by allowing the casing mixture 64 within the second hemispherical half 23B to cure during the predetermined time period. The curing may include allowing the casing mixture 64 to rest at ambient temperature, heating the casing mixture 64 to a temperature suitable for curing and/or drying, curing casing mixture 64 via a chemical curing process involving a chemical curing agent mixed with casing mixture 64, or any other process suitable for providing the casing mixture 64 with a dry finished surface. In step 1012, the hemispheres of the mold portions 51 and 52 may be separated and the now sport ball 10, including casing 20, intermediate layer 30, and bladder 40, may be removed from the mold 50. The sport ball 10 may now be substantially formed, save the addition of casing panels 21. In some cases, the sport ball 10 may be completely formed and there may be no need for casing panels 21.

Sports ball 10 with casing 20 present thereon may then be permitted to cool and/or rest. The excess portions of polymer films 62 may be removed from the formed casing 20.

In step 1012, the excess polymer films 62 may be removed, and the sports ball 10 with casing 20 thereon may then be fitted for paneling. Moving to step 1014, one of the casing panels 21 may be placed within a mold 90. Mold 90 may be comprised of two mold portions 94 and 96, wherein mold portion 94 may have placed therein a mesh 92. Mold portion 96 may have disposed thereon an inlet 98. Casing panel 21 may be placed on mesh 92. Sport ball 10 with casing 20, intermediate layer 30, and bladder 40 may then be disposed on the casing panel 21 within the mold portion 96. It is contemplated that any sport ball with a generally spherical shape may be placed within the mold portion 96. Additionally, it is contemplated that a sport ball with any shape necessary for the desired sport may be placed within the mold portion 96. Mold portions 94 and 96 may come together to enclose the sport ball 10, casing panel 21, and mesh 92. A fluid may be injected into the sport ball 10 via the inlet 98 to inflate the sport ball 10 thereby pressing the casing panel 21 into the mesh 92. After a predetermined period of time, the mold portions 94 and 96 may be separated and the sport ball 10, casing panel 21, and mesh 92 removed from the mold 90. The mesh 92 may impart a texture or pattern onto an exterior of the casing panel 21. This process may be repeated as necessary for each individual casing panel of the plurality of casing panels 21 to impart the texture or pattern onto the exteriors of the casing panels 21.

Referring to step 1016, upon the casing panels 21 having the shape of the sport ball 10, the casing panels 21 may be attached to the casing 20 of the sport ball 10. The attachment of the casing panels 21 to the casing 20 may be the final step in completing sport ball 10. It is contemplated that the method of attaching the casing panels 21 to the casing 20 of the sports ball 10 may include gluing, stitching, thermoforming, welding, or the like. Additionally, it is contemplated that the method of attachment may be any method suitable for connecting the casing panels 21 to the casing 20 of the sports ball 10.

An advantage to this manufacturing process is that sport ball 10 may have a greater sphericity than that of traditionally manufactured sport balls 10. For example, the sports ball 10 may have a sphericity that is less than 1%. In an exemplary embodiment, the sports ball 10 may have a sphericity between 0.55% and 0.88%. It is contemplated that the sphericity of the sports ball 10 may be equal to or less than 1.8%. This sphericity may be measured by a process known in the art using a CSM machine. In particular, the test used may be the Sphericity—FIFA Footballs Test 02, as documented in FIFA Quality Programme for Footballs (outdoor, futsal and beach soccer footballs), which is incorporated by reference in its entirety. Accordingly, various performance characteristics of ball 10 may be enhanced by providing a more spherical shape.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The following clauses provide an exemplary configuration for an article of footwear and sole structure described above.

Clause 1. A sport ball comprising a bladder enclosing a volume of gas; a casing including a casted material, wherein the casing encloses the bladder.

Clause 2. The sport ball according to clause 1, wherein one or more casing panels are disposed on an outer surface of the casing.

Clause 3. The sport ball of clause 2, wherein the casing panels are coupled to the outer surface of the casing by an adhesive.

Clause 4. The sport ball of clause 2, wherein the casing panels are integrally formed as part of the outer surface of the casing.

Clause 5. The sport ball of clause 4, wherein the casing panels include one or more grooves, ridges, recesses, or dimples.

Clause 6. The sport ball of clause 1, wherein the casted material includes a polymer.

Clause 7. The sport ball of clause 1, wherein the casted material includes a polyurethane foam.

Clause 8. The sport ball of clause 1, wherein the casing includes two hemispherical halves joined at a single circumferential seam.

Clause 9. The sport ball of clause 1, further including an intermediate layer disposed radially between the casing and the bladder, wherein the intermediate layer is configured to contain radially outward directed generated by the bladder and enclosed gas.

Clause 10. The sport ball of clause 1, wherein the casing completely encloses the bladder.

Clause 11. The sport ball of clause 1, wherein the casing includes only the casted material.

Clause 12. The sport ball of clause 1, wherein the casing has a radial thickness of about 5 mm.

Clause 13. The sport ball of clause 1, wherein the casted material includes one of a bio-EVA or a thermoplastic polyurethane.

Clause 14. A method of manufacturing a sport ball, the method comprising forming a casing around a fluid-filled bladder by casting.

Clause 15. The method of clause 14, wherein the forming the casing includes pouring liquid casting material into a first mold, and placing the fluid-filled bladder into the liquid casting material.

Clause 16. The method of clause 15, wherein forming the casing includes curing the liquid casting material in the first mold to form a first casing segment around the fluid-filled bladder.

Clause 17. The method of clause 16, wherein forming the casing further includes placing an exposed portion of the fluid-filled bladder into a second mold containing liquid casing material.

Clause 18. The method of clause 17, further including curing the liquid casting material in the second mold to form a second casing segment that is coupled to the first casing segment.

Clause 19. The method of clause 18, wherein the first casing segment and the second casing segment form a substantially spherical shape, and the method further includes attaching one or more panels to an exterior surface of the substantially spherical shape.

Clause 20. The method of clause 14, wherein the sport ball has a sphericity of less than about 0.88%.

Clause 21. The sport ball of clause 1, wherein the sport ball has a sphericity of less than about 0.88%

I claim:

1. A sport ball comprising:

a bladder enclosing a volume of gas, the bladder comprised of a first material, the bladder being sealed and valveless;

an intermediate layer disposed radially adjacent to the bladder, wherein the intermediate layer is configured to contain the bladder and enclosed gas, and wherein the intermediate layer is formed of a second material different from the first material of the bladder;

a casing including a casted material different from the first material and the second material, and the casing including two hemispherical halves joined at a single circumferential seam, wherein the casted material includes a polyurethane foam, and wherein the casing encloses each of the bladder and the intermediate layer; and one or more casing panels attached to an outer surface of the casing, the one or more casing panels forming an outermost surface of the sport ball.

2. The sport ball of claim 1, wherein the one or more casing panels include one or more grooves, ridges, recesses, or dimples.

3. The sport ball of claim 1, wherein the casted material includes a polymer.

4. The sport ball of claim 1, wherein the casing includes only the casted material.

5. The sport ball of claim 1, wherein the casing has a radial thickness of about 5 mm.

6. The sport ball of claim 1, wherein the casted material includes a thermoplastic polyurethane.

7. The sport ball of claim 1, wherein the sport ball has a sphericity of less than about 0.88%.

8. The sport ball of claim 1, wherein the bladder comprises thermoplastic polyurethane.

9. The sport ball of claim 1, wherein the bladder comprises two hemispherical bladder panels joined by a single seam.

* * * * *